(12) United States Patent
Turner et al.

(10) Patent No.: US 7,336,185 B2
(45) Date of Patent: Feb. 26, 2008

(54) COMBINATION ID/TAG HOLDER

(75) Inventors: Florrie Turner, Sutter, CA (US);
Douglas Ahlers, Yuba City, CA (US);
Bernie DiDario, Sutter, CA (US)

(73) Assignee: InCom Corporation, Sutter, CA (US)

( * ) Notice: Subject to any disclaimer, the term of this patent is extended or adjusted under 35 U.S.C. 154(b) by 181 days.

(21) Appl. No.: 11/023,909

(22) Filed: Dec. 27, 2004

(65) Prior Publication Data
US 2006/0152368 A1    Jul. 13, 2006

(51) Int. Cl.
*G08B 13/14*    (2006.01)
(52) U.S. Cl. .................. 340/572.8; 40/1.5; 40/642.02; 235/492
(58) Field of Classification Search .. 340/572.1–572.9; 235/492; 40/1.5, 642.02–661.12
See application file for complete search history.

(56) References Cited

U.S. PATENT DOCUMENTS

| | | | |
|---|---|---|---|
| 2,101,033 A | 12/1937 | Mashbir | |
| 3,134,074 A | 5/1964 | Litke | |
| 4,510,489 A * | 4/1985 | Anderson et al. | 340/572.1 |
| 5,880,675 A * | 3/1999 | Trautner | 340/572.8 |
| 5,936,542 A * | 8/1999 | Kleinrock et al. | 340/5.61 |
| 5,973,598 A | 10/1999 | Beigel | |
| 5,986,562 A | 11/1999 | Nikolich | |
| 5,986,566 A | 11/1999 | Yamamori | |
| 6,011,472 A * | 1/2000 | Pendergraph et al. | 340/568.1 |
| 6,201,474 B1 * | 3/2001 | Brady et al. | 340/572.8 |
| 6,347,301 B1 * | 2/2002 | Bearden et al. | 705/1 |
| 6,433,686 B1 * | 8/2002 | Feibelman | 340/572.8 |
| 6,452,497 B1 * | 9/2002 | Finlayson | 340/572.8 |
| 6,475,443 B1 * | 11/2002 | van Deursen et al. | 422/102 |
| 6,526,158 B1 | 2/2003 | Goldberg | |
| 6,594,370 B1 | 7/2003 | Anderson | |
| 6,677,917 B2 | 1/2004 | Van Heerden | |
| 6,680,707 B2 | 1/2004 | Allen | |
| 6,822,569 B1 * | 11/2004 | Bellum et al. | 340/572.1 |
| 6,848,207 B1 * | 2/2005 | Powell | 40/661 |
| 2003/0106931 A1 | 6/2003 | Wu | |
| 2003/0146839 A1 | 8/2003 | Ehlers | |
| 2003/0156033 A1 * | 8/2003 | Savage et al. | 340/572.8 |
| 2003/0169207 A1 | 9/2003 | Beigel | |
| 2003/0173408 A1 | 9/2003 | Mosher, Jr. | |
| 2003/0197607 A1 | 10/2003 | Striemer | |
| 2003/0213826 A1 * | 11/2003 | Jacobs | 224/610 |
| 2004/0140897 A1 | 7/2004 | Fabre | |
| 2006/0117617 A1 * | 6/2006 | Peterson et al. | 40/1.6 |

FOREIGN PATENT DOCUMENTS

| | | | |
|---|---|---|---|
| DE | 19642590 A1 * | 4/1998 | |
| GB | 2036447 | 6/1980 | |
| GB | 2269798 A * | 2/1994 | |
| JP | 2003271910 | 9/2003 | |

* cited by examiner

*Primary Examiner*—Benjamin C. Lee
(74) *Attorney, Agent, or Firm*—Heisler & Associates

(57) ABSTRACT

A combination ID/tag holder is disclosed. The holder comprises (i) a holder body, (ii) a first pouch for holding a traditional ID card, (iii) a second pouch for holding a tag container, (iv) a tag container, for placement in the second pouch, and (v) a tag, such as a RFID tag, for placement in the tag container. The present invention can be used in conjunction with an automated attendance monitoring system to monitor attendance of students or other individuals whose whereabouts need to be tracked.

25 Claims, 4 Drawing Sheets

COMBINATION ID/TAG HOLDER

BACKGROUND OF THE INVENTION

1. Field of the Invention

This invention relates to holders for ID cards and other objects.

2. General Background

The applicants for the present application have previously developed an automated attendance tracking system. That system is disclosed in U.S. Ser. No. 10/919,723, filed Aug. 16, 2004, and the disclosure of that application is incorporated herein by reference.

The applicant's automated attendance monitoring system uses tags (worn or carried by students or other attendees) and readers to monitor the whereabouts of individuals. Thus, for instance, as students enter a classroom, the antenna of a reader placed near the door would interact with Radio Frequency Identification ("RFID") tags that are worn or carried by the students. The system would then track which students have entered the classroom, and by comparing the list of entering students with the class list, the system could generate a provisional list of absent students. The teacher or other attendance monitor could then visually confirm attendance, and could use a handheld computer system to update and finalize the provisional attendance record.

In order for such an automated attendance tracking system to reliably monitor attendance, there must be good communication between the tag and the antenna of the reader. A number of factors can affect the ability of the tag to communicate with the antenna of the reader.

First, the position of the tag relative to the antenna of the reader can affect "readability." Given current RFID technology, the tag should generally be parallel to the reader's antenna. For tracking the movement of inanimate objects, like inventory or crates, it is not difficult to maintain the tag in the proper orientation, but for humans—especially constantly-moving students—it may be difficult to maintain proper orientation.

Second, the signal between the antenna of the reader and the tag is subject to interference, especially from the moisture and organic compounds that are associated with the human body, as well as clothes, backpacks, etc. Because of these hurdles, RFID tags have not been widely used for tracking humans, but instead have been primarily used for tracking objects such as inventory.

However, as explained below, the applicants have now overcome the obstacles that have hindered the use of RFID tags on humans.

SUMMARY OF THE INVENTION

The present invention is a combination ID/tag holder, comprising (i) a holder body, (ii) a first pouch for holding a traditional ID card, (iii) a second pouch for holding a tag container, (iv) a tag container, for placement in the second pouch, and (v) a tag, for placement in the tag container.

DETAILED DESCRIPTION

Figure 1:
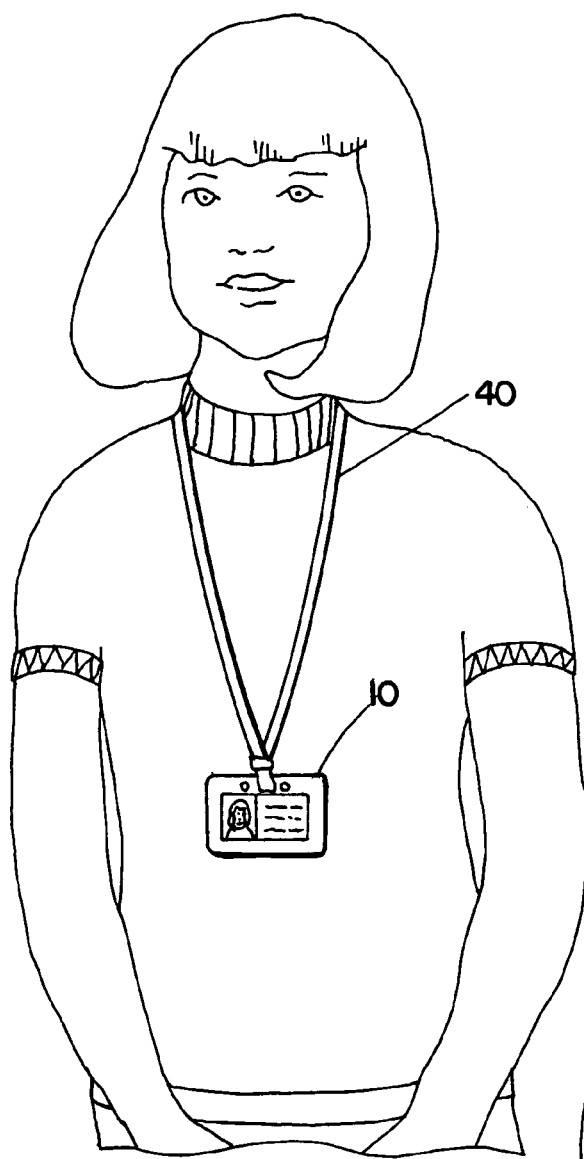
FIG. 1 is an environmental drawing showing a holder according to an embodiment of the present invention as worn by a student, wherein the holder hangs from a lanyard around the student's neck.
Figure 2:
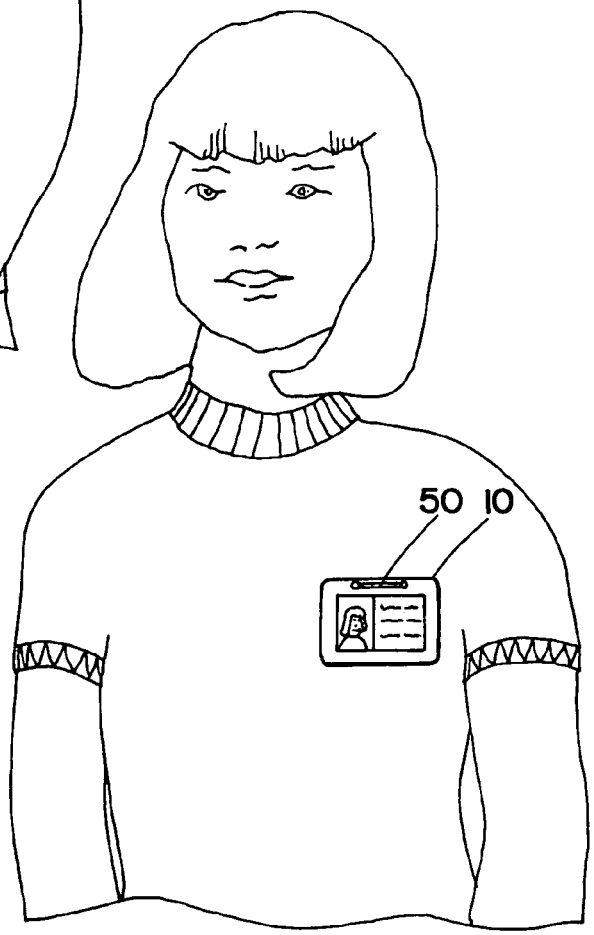
FIG. 2 is an environmental drawing showing a holder according to an embodiment of the present invention as worn by a student, wherein the holder is clipped to the student's shirt.
Figure 3:
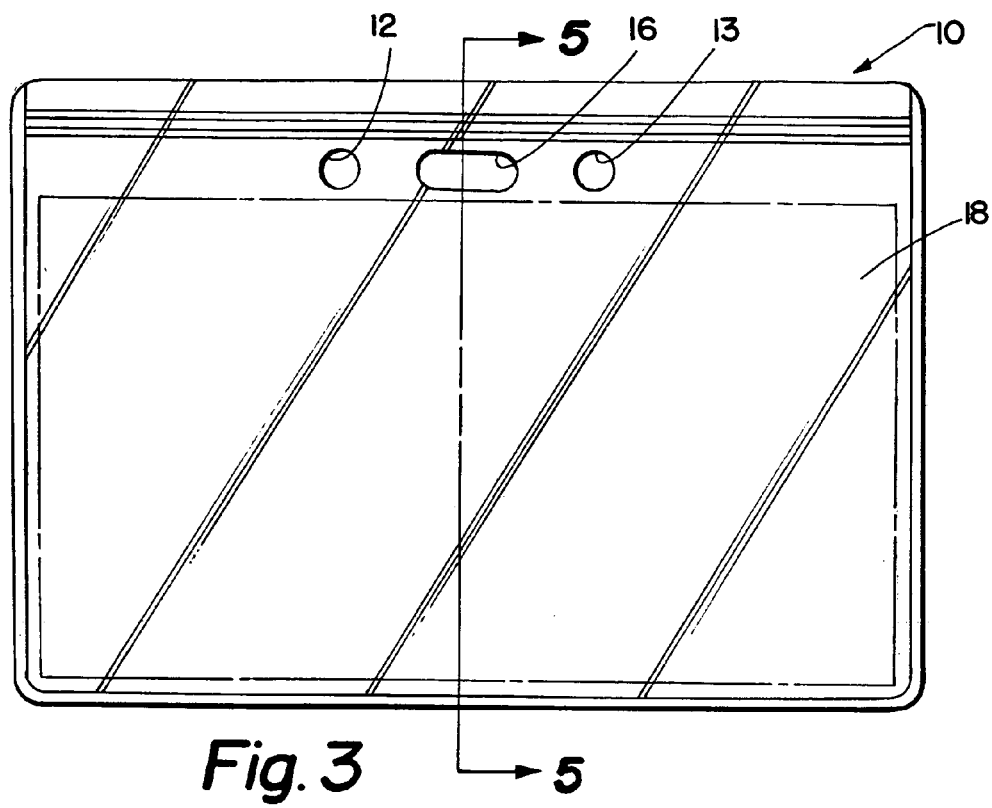
FIG. 3 is a front view of a holder according to an embodiment of the present invention.

The present invention is a combination ID/tag holder, comprising (i) a holder body, (ii) a first pouch 18 for holding a traditional ID card, (iii) a second pouch 20, (iv) a tag container 30, for placement in the second pouch, and (v) a tag 34 for placement in the tag container 30. The present invention also optionally includes (vi) clip apertures 12, 13, for clipping the holder to a user's clothing, (vii) a lanyard aperture 16, for hanging the holder from a lanyard, (viii) a pocket flap 22 for securing the holder to a user's pocket, (ix) an ID pouch zip locking means 24, for sealing the ID pouch, and (x) tag container caps 32, 33 for sealing the ends of the tag container 30.

The holder includes a body 10 that supports the pouches and other features of the present invention. See FIGS. 1-7. The body 10 may be integrated into a single piece, or it may be made of multiple pieces. For purposes of this patent, "body" refers to any structure that supports the pouches.

The body 10 has a first pouch 18 for holding an ID card, such as a student ID or an employee ID. See FIGS. 1-7. The first pouch 18 may have zip-locking means 24 to seal the pouch. See FIG. 5. Typically, the first pouch 18 would be on the front of the holder 10, so that the ID could be conveniently shown to teachers or others.

Figure 4:
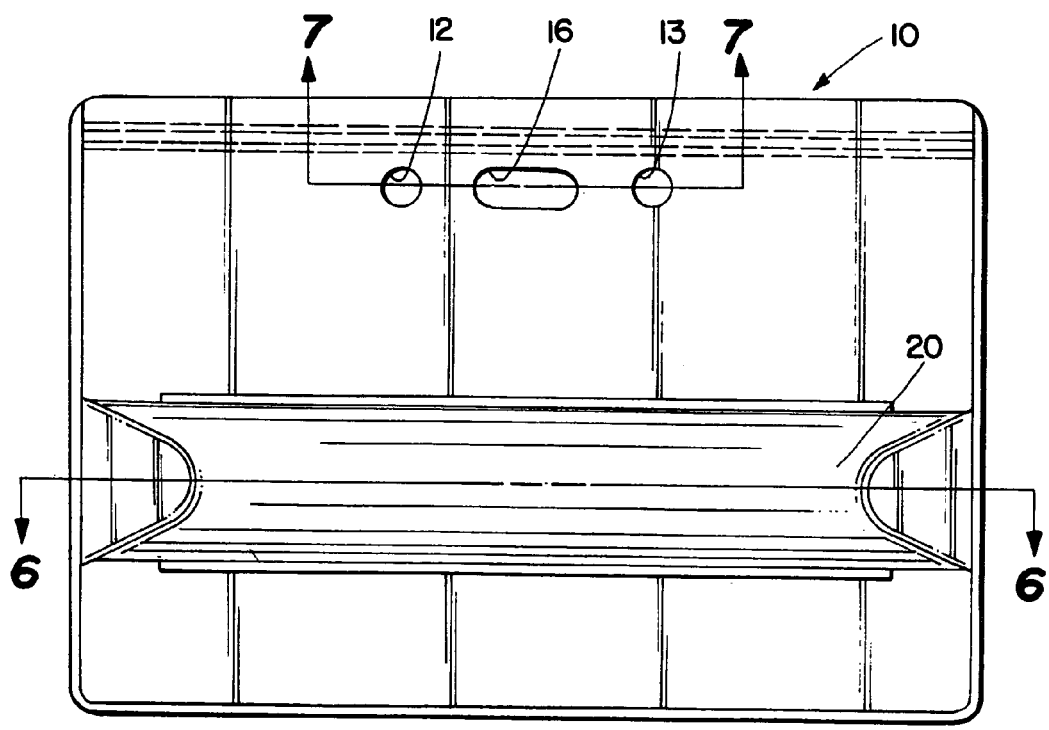
FIG. 4 is a rear view of a holder according to an embodiment of the present invention.
Figure 5:
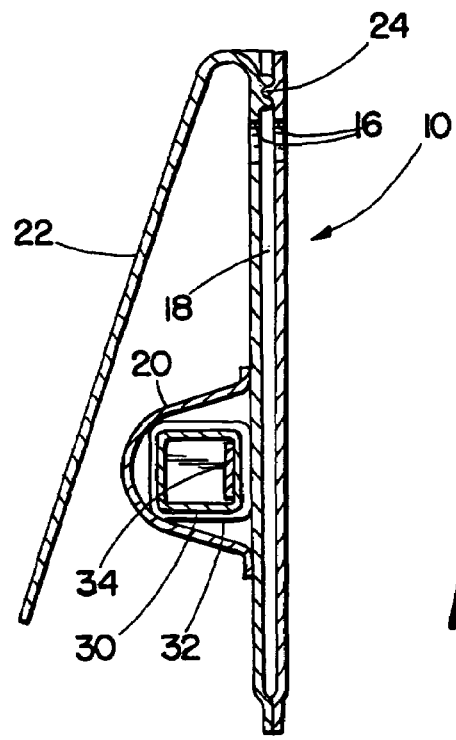
FIG. 5 is a cross-section taken along lines 5-5 of FIG. 3. This is the only figure that shows the embodiment containing a pocket flap.
Figure 6:
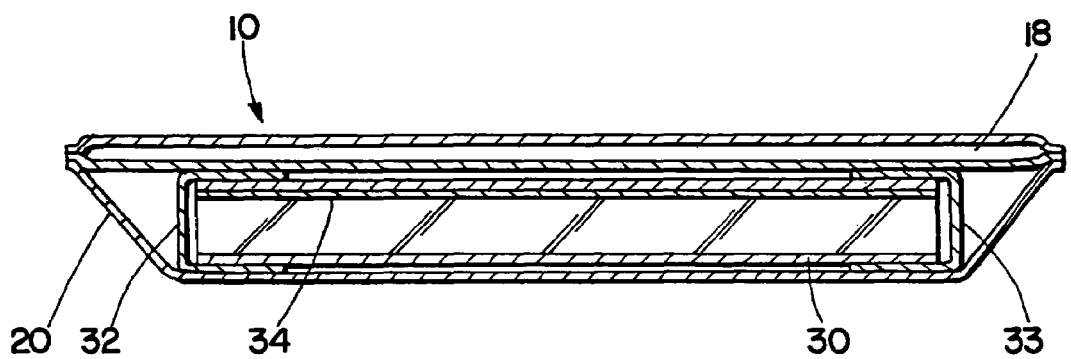
FIG. 6 is a sectional view taken along lines 6-6 of FIG. 4.
Figure 7:
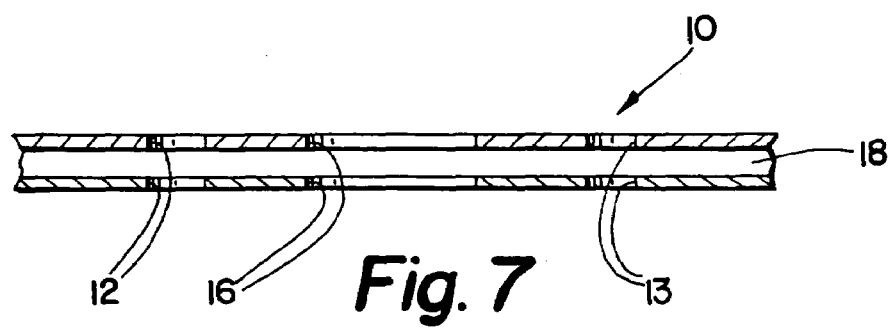
FIG. 7 is a sectional view taken along lines 7-7 of FIG. 4.

The body 10 also has a second pouch 20, as shown best in FIGS. 4, 5, and 6. This second pouch 20 is for holding the tag container 30. The second pouch 20 would typically but not necessarily be placed on the opposite side of the body 10 from the first pouch 18. The second pouch 20 may be sealed at the ends after the tag container 30 has been inserted, to prevent tampering. See FIG. 6.

The second pouch 20 would typically run longitudinally along the pouch, thereby keeping the tag container 30 and thus the tag 34 in a horizontal position, parallel to the antenna of the reader. (Readers and their antennas would typically be installed in a horizontal position, possibly over a doorway). With current RFID technology, it is advantageous to keep the tag in a position parallel to the reader to maximize readability.

Figure 8:
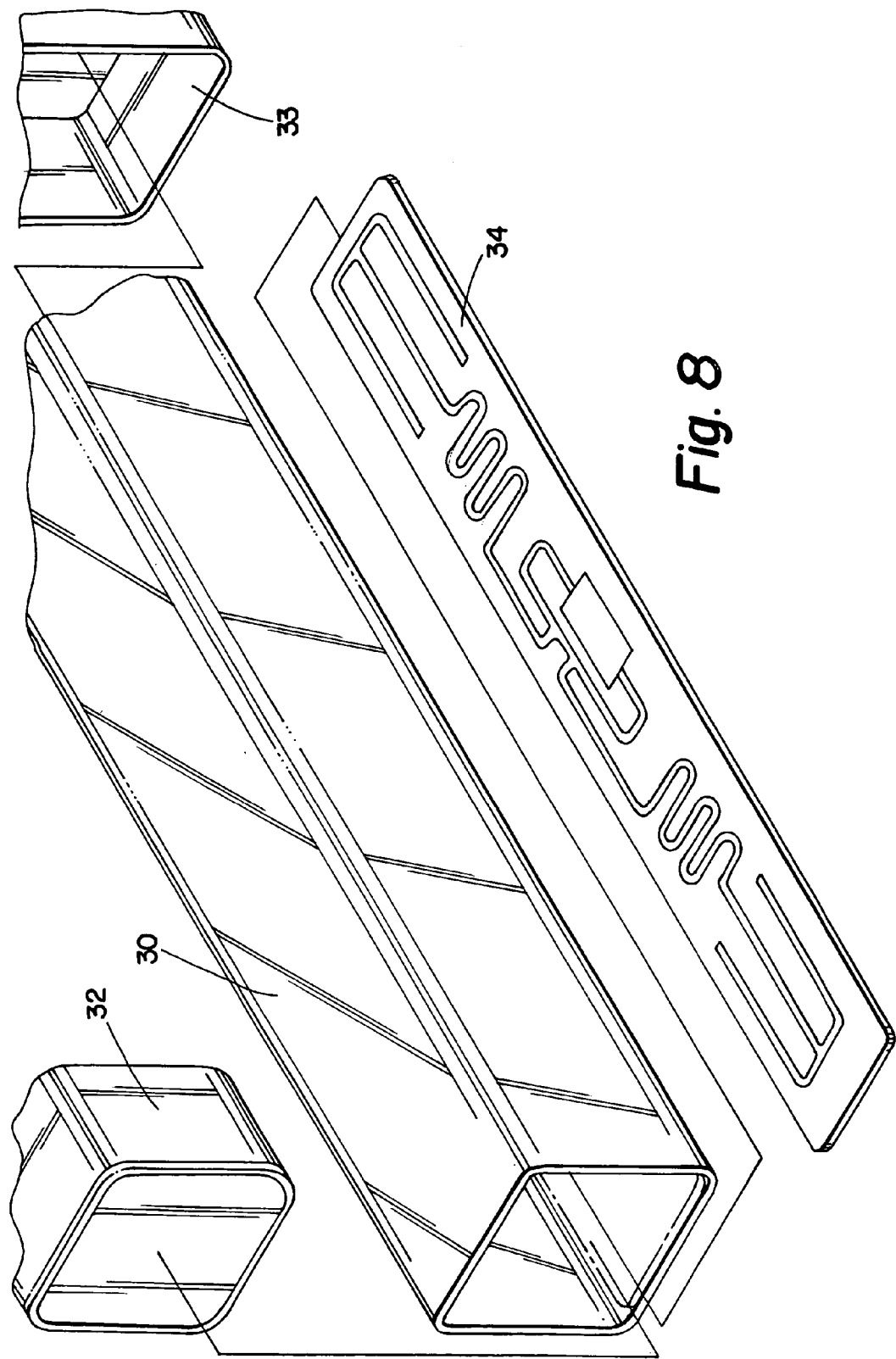
FIG. 8 is a perspective view of a tag container and a tag according to an embodiment of the present invention.

The tag container 30 holds the tag 34. In one embodiment, the tag container 30 is a hollow rectangular container with tag container caps 32, 33 at the ends for sealing the container 30. The tag container 30 can also be many other shapes, including circular, oval etc. The size and shape of the tag container 30 will vary with the size and shape of the tag 34. See FIGS. 6 and 8. The tag container 30 typically is made of plastic, such as Polyethylene Terephthalate Glycol ("PETG"), but numerous other grades and types of plastic could be used. The tag container should not have a high carbon concentration, it should be crush resistant, and it should not melt or soften at temperatures below 120° F.

The tag container 30 and second pouch 20 typically would be designed so as to hold the tag 34 in a substantially horizontal position, so long as the user is upright in a normal sitting or standing position. Thus, in one embodiment, the second pouch 20 holds the tag container 34 so that it—and therefore the tag 34 itself—cannot be rotated while in the pouch 20. This goal is accomplished by sizing and shaping the second pouch 20 so that it is only slightly larger than the tag container 30 itself, thereby ensuring that tag container 30 fits snugly in the second pouch 20. See FIGS. 5 and 6.

The tag 34 is used to automatically track attendance, and for purposes of this patent, "tag" refers to any electronic device that can be used to indicate physical location. "Tag" includes but is not limited to RFID tags.

The tag 34 is placed in or on the tag container 30. In one embodiment, the tag is affixed to the inside surface of a wall in the tag container 30. See FIG. 5. This configuration provides a protective air cushion between the tag 34 and the user, thereby minimizing the interference caused by the humidity and organic compounds associated with the human body. As shown in FIG. 5, the tag container 30 can be placed in the second pouch 20 so that the protective air cushion is between the user's body and the tag 34.

For a rectangular container, the protective air cushion is defined by the distance between the interior surface of one wall of the container 30 (where the tag 34 is affixed) and the interior surface of the opposite wall. In one embodiment, this distance is at least 0.5 mm, and it could be even greater. In general terms, the protective air cushion is the open space between the tag and an opposite point or wall on the tag container.

In addition to the protective air cushion, the walls of the tag container 30 itself also help to protect the tag 34 from interference by moisture and organic compounds.

In alternative embodiments, the tag 34 can also be placed in the interior of the tag container, and not affixed to a wall. If the tag 34 is placed in the middle of the tag container 30, then it may have a protective air cushion on both sides.

The body 10 may have clip apertures 12, 13 for attaching the holder to a user's clothing by means of a clip 50. See FIGS. 1-4. It may also have a lanyard aperture 16 for attaching the holder to a lanyard 40 that is worn around the user's neck. See FIGS. 1-4. The body may also have a pocket flap 22 for insertion into a user's pocket. See FIG. 5.

In use, a tag container 30 with a user's tag 34 would be placed into the second pouch 20. The second pouch 20 would then typically be sealed, to ensure that the tag 34 is not tampered with or removed. The user's ID could then be placed in the first pouch 18.

The user would then wear the holder, either with a lanyard 40, or with a clip 50, or in the user's shirt pocket using the pocket flap 22. See FIGS. 1 and 2. Because the tag container 30 is snugly held within the second pouch 20, the tag container 30 will stay in a horizontal position, parallel to the antenna of the reader, so long as the user stays in an upright position. The holder and its protective air cushion also maintain a minimum distance between the user's body and the tag 34, so as to minimize absorption of RFID waves or other signals by the user's body.

The user's whereabouts could then be tracked throughout the school or other area, using the automated attendance monitoring system.

The present device greatly enhances the readability of tags worn by humans, and therefore has a number of advantages. For instance, unlike users of proximity cards, the users of the present invention would not need to hold their tag close to a reader in order for it to be read by the scanner. Instead, users of the present device could simply walk past the reader, confident that their tags would be read.

The holder and its components 10 may be made of many materials, including various types of plastics.

One skilled in the art will appreciate that the present invention can be practiced by other than the preferred embodiments, which are presented for purposes of illustration and not of limitation.

We claim:

1. A holder comprising:
  a body;
  a first pouch for holding an ID, wherein said first pouch is supported by said body;
  a second pouch for holding a tag container, wherein said second pouch is supported by said body;
  a tag container, for placement in said second pouch;
  additionally comprising a tag located within said tag container;
  wherein said tag is an RFID tag; and
  additionally comprising a protective air cushion in said tag container between said tag and portions of said tag container adapted to be closest to a user wearing the holder, said protective air cushion adapted to provide an open minimum distance between said tag and a user wearing the holder.

2. The holder according to claim 1, wherein said protective air cushion measures at least 0.5 mm.

3. The holder according to claim 1, wherein said second pouch is sealed after the tag container has been placed in said second pouch.

4. The holder according to claim 1, additionally comprising caps on said tag container.

5. The holder according to claim 1, wherein said tag container and said second pouch are sized and shaped so that said tag container snugly fits within said second pouch.

6. The holder of claim 1, wherein said tag container is a hollow elongate generally rectangular walled enclosure having a length between ends that is longer than a height between opposite top and bottom walls and that is longer than a depth between opposite front and rear walls, said tag being elongate in form, said tag located spaced from said rear wall by an open distance defined by said protective air cushion, said tag container adapted to have its length extend substantially horizontally when worn by the user.

7. The holder of claim 6, wherein said tag has a height similar to a height of said tag container and a length similar to said length of said tag container, but with said depth less than said depth of said tag container.

8. A holder comprising:
  a body;
  a pouch for holding a tag container, wherein said pouch is supported by said body;
  a tag container, for placement in said pouch;
  a tag, for placement in said tag container;
  wherein said tag is affixed to said tag container; and
  wherein said tag container includes a protective air cushion between said tag and portions of said tag container adapted to be closest to a user wearing the holder, said protective air cushion adapted to provide an open minimum distance between said tag and a user wearing the holder.

9. The holder according to claim 8, wherein said protective air cushion is at least 0.5 mm.

10. The holder according to claim 9, wherein said tag is an RFID tag.

11. A method of creating and using a tag holder:
  providing a tag;
  providing a hollow tag container;
  placing said tag in said tag container;

providing a holder with a pouch;

placing said tag container in said pouch;

directing human users of said holder to wear said holder for attendance tracking purposes; and additionally comprising affixing said tag to said tag container, said container larger than said tag, said container including a wall spaced from said tag by an open minimum distance, said wall adapted to be located closer to the human user of said holder than said tag, such that said tag is spaced from the human user by said open distance to enhance readability of said tag.

12. The method according to claim 11, additionally comprising sealing said pouch after placing said tag in said tag container.

13. The method according to claim 11, additionally comprising sealing said tag container by placing caps on said tag container.

14. A combination ID/tag holder comprising:

a body, said body having a first side and a second side;

a first pouch on said first side;

a second pouch on said second side;

an ID in said first pouch;

a tag container in said second pouch;

a tag in said tag container;

a protective air cushion in said tag container; and means for attaching said holder to a person with said protective air cushion between said tag and said person.

15. The holder according to claim 14, wherein said tag is an RFID tag.

16. A holder for a remotely readable tag to allow the tag to be consistently read while borne by a human user, the tag having an elongate form with a horizontal length greater than a vertical height and the height greater than a horizontal depth, the holder comprising in combination:

a tag suspension adapted to couple the tag to the human user;

a tag orientation controller adapted to keep the tag with its length extending substantially horizontally and extending lateral to the human user when said tag suspension is in use coupling the tag to the human user; and a tag spacing maintainer adapted to keep the tag spaced in depth away from the human user by a minimum distance to minimize interference with tag reading caused by the human user's attenuation of signals interacting with the tag.

17. The holder of claim 16, wherein said tag suspension includes a lanyard adapted to be worn about a portion of the human user.

18. The holder of claim 16, wherein said tag suspension includes a clip adapted to be attached to clothing worn by the human user.

19. The holder of claim 16, wherein said tag orientation controller includes an elongate space at least as large as said tag, said space enclosed by walls coupled to said tag suspension, said elongate space extending horizontally and lateral to the human user when said tag suspension is coupled to the human user.

20. The holder of claim 19, wherein said elongate space includes a pouch in a body, with said body coupled to said tag suspension.

21. The holder of claim 20, wherein said elongate space includes an elongate tag container sized to fit within said pouch in said body, with said tag container sized to receive the tag therein.

22. The holder of claim 21, wherein said tag container includes a depth greater than a depth of the tag with the tag adapted to be maintained within said tag container in a location spaced from a wall of said tag container adapted to be located closer to the human user than the tag when the tag suspension is coupled to the human user, such that said tag container provides at least a portion of said tag spacing maintainer.

23. The holder of claim 16, wherein said tag spacing maintainer includes a wall adapted to be coupled to the tag and adapted to be spaced from the tag on a side of the tag closer to the human user, said wall adapted to be spaced by said minimum distance from said tag.

24. The holder of claim 23, wherein said wall defines a portion of a tag container sized to contain the tag with said minimum distance maintained within said tag container.

25. The holder of claim 24, wherein said tag container is adapted to be affixed to the tag on a portion of said tag container spaced from said wall.

* * * * *